United States Patent
Ball et al.

(10) Patent No.: US 9,249,616 B2
(45) Date of Patent: Feb. 2, 2016

(54) SHOWER DOOR JAMB SEAL

(71) Applicant: Kohler Co., Kohler, WI (US)

(72) Inventors: Matthew Joseph Ball, Sheboygan Falls, WI (US); Kyle Kragenbring, Hastings, MN (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 14/203,381

(22) Filed: Mar. 10, 2014

(65) Prior Publication Data
US 2014/0260009 A1  Sep. 18, 2014

Related U.S. Application Data

(60) Provisional application No. 61/785,532, filed on Mar. 14, 2013.

(51) Int. Cl.
| | |
|---|---|
| A47K 3/30 | (2006.01) |
| E06B 3/58 | (2006.01) |
| E06B 7/22 | (2006.01) |
| A47K 3/28 | (2006.01) |
| A47K 3/36 | (2006.01) |
| E06B 3/62 | (2006.01) |
| A47K 3/34 | (2006.01) |
| F16J 15/02 | (2006.01) |
| F16J 15/06 | (2006.01) |

(52) U.S. Cl.
CPC . *E06B 7/22* (2013.01); *A47K 3/283* (2013.01); *A47K 3/284* (2013.01); *A47K 3/30* (2013.01); *A47K 3/34* (2013.01); *A47K 3/36* (2013.01); *E06B 3/58* (2013.01); *E06B 3/62* (2013.01); *F16J 15/025* (2013.01); *F16J 15/061* (2013.01); *A47K 2003/305* (2013.01); *A47K 2003/307* (2013.01)

(58) Field of Classification Search
CPC . A47K 3/283; A47K 3/284; A47K 2003/305; A47K 2003/307; A47K 3/30; A47K 3/34; A47K 3/36; F16J 15/025; F16J 15/061
See application file for complete search history.

(56) References Cited

U.S. PATENT DOCUMENTS

| | | |
|---|---|---|
| 1,944,440 A | 1/1934 | Lehman |
| 2,331,822 A | 10/1943 | Zechiel et al. |

(Continued)

FOREIGN PATENT DOCUMENTS

| | | |
|---|---|---|
| CN | 202645276 | 1/2013 |
| DE | 202011102257 | 2/2012 |

(Continued)

OTHER PUBLICATIONS

European Search Report dated May 19, 2014 (Application No. 14158979.6) 6 pages.

(Continued)

*Primary Examiner* — Andrew J Triggs
(74) *Attorney, Agent, or Firm* — Foley & Lardner LLP

(57) ABSTRACT

A wall jamb for a showering enclosure includes a plurality of legs configured to receive the shower door panel therebetween, a base connecting the plurality of legs such that the wall jamb is generally U-shaped, and a pressure sensitive adhesive disposed at an exterior surface of the base. The pressure sensitive adhesive is configured to adhere to a wall of the showering enclosure. The plurality of legs and the base are formed of a resilient material.

13 Claims, 7 Drawing Sheets

(56) References Cited

U.S. PATENT DOCUMENTS

| | | | | |
|---|---|---|---|---|
| 2,980,969 | A * | 4/1961 | Tinfow | 49/411 |
| 3,449,770 | A | 6/1969 | Casebolt | |
| 3,461,466 | A * | 8/1969 | Stahlhut et al. | 4/557 |
| 3,737,921 | A | 6/1973 | Baumrind | |
| 3,852,916 | A * | 12/1974 | Laby | 49/409 |
| 3,855,642 | A * | 12/1974 | Blitch | A47K 3/38 160/349.2 |
| 3,955,789 | A | 5/1976 | Baumrind | |
| 3,956,855 | A * | 5/1976 | Walker | 49/504 |
| 4,178,718 | A * | 12/1979 | Laby | 49/411 |
| 4,189,790 | A * | 2/1980 | Masters, III | A47K 3/14 4/559 |
| 4,392,272 | A | 7/1983 | Finkel | |
| 4,720,876 | A * | 1/1988 | Tomei et al. | 4/614 |
| 4,759,087 | A | 7/1988 | Zeilinger | |
| 4,856,126 | A * | 8/1989 | Baus | 4/607 |
| 4,887,324 | A | 12/1989 | Cairns | |
| 4,944,050 | A * | 7/1990 | Shames | A47K 3/281 160/349.2 |
| 5,023,965 | A | 6/1991 | Reichel | |
| 5,079,872 | A * | 1/1992 | Short | 49/409 |
| 5,274,859 | A * | 1/1994 | Redman | A47K 3/30 160/349.1 |
| 5,337,425 | A | 8/1994 | Hill | |
| 5,588,181 | A * | 12/1996 | Sutton | 16/252 |
| 5,634,219 | A * | 6/1997 | Paredes et al. | 4/558 |
| 5,690,157 | A * | 11/1997 | Chen | 160/199 |
| 5,867,846 | A * | 2/1999 | Paredes et al. | 4/558 |
| 5,908,064 | A * | 6/1999 | Bruce | 160/202 |
| 6,067,672 | A | 5/2000 | Klotz | |
| 6,148,452 | A | 11/2000 | Kirsopp | |
| 6,655,444 | B2 | 12/2003 | Goldenberg et al. | |
| 6,817,144 | B1 * | 11/2004 | Tavivian | A47K 3/30 4/607 |
| 7,644,453 | B2 | 1/2010 | Dyckow | |
| 7,877,825 | B1 * | 2/2011 | Marshall et al. | 4/612 |
| 2002/0185072 | A1 | 12/2002 | Walpin | |
| 2003/0070221 | A1 | 4/2003 | Goldenberg et al. | |
| 2014/0260009 | A1 * | 9/2014 | Ball et al. | 52/207 |

FOREIGN PATENT DOCUMENTS

| | | |
|---|---|---|
| DE | 202011102257 | 3/2012 |
| WO | WO 01/39647 | 6/2001 |
| WO | WO0139647 | 6/2001 |

OTHER PUBLICATIONS

Notice of First Office Action issued May 29, 2015 regarding Chinese Application No. 201410090859.6.

* cited by examiner

SHOWER DOOR JAMB SEAL

CROSS REFERENCE TO RELATED APPLICATIONS

This application claims the benefit of U.S. Provisional Application No. 61/785,532 filed on Mar. 14, 2013, which is hereby incorporated by reference in its entirety.

FIELD

The present application relates generally to the field of shower doors. More specifically, the present application relates to a shower door wall jamb seal for a shower door panel that provides a water barrier between the connection of the shower door panel and a shower wall which may or may not maintain the closed position of the shower door panel, or decelerate it upon closing.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Shower doors must be relatively watertight to prevent water damage and to keep water from spraying or leaking out during a shower. Conventional shower doors may include a watertight seal formed by applying silicone caulk on an inside and/or an outside of the edges of the shower door's wall jambs. A seal applied to the door's edge, may also form the watertight seal, with or without the use of a wall jamb. Alternatively, a seal applied to a wall jamb may also form the watertight seal.

SUMMARY

An exemplary embodiment relates to a wall jamb a showering enclosure includes a plurality of legs configured to receive the shower door panel therebetween, a base connecting the plurality of legs such that the wall jamb is generally U-shaped, and a pressure sensitive adhesive disposed at an exterior surface of the base. The pressure sensitive adhesive is configured to adhere to a wall of the showering enclosure. The plurality of legs and the base are formed of a resilient material.

Another exemplary embodiment relates to a system for sealing a showering enclosure including at least one shower door panel and at least one wall jamb configured to be installed on a wall of the showering enclosure. The wall jamb includes a plurality of legs configured to receive the shower door panel therebetween, a base connecting the plurality of legs such that the wall jamb is generally U-shaped, and a pressure sensitive adhesive disposed at an exterior surface of the base. The pressure sensitive adhesive is configured to adhere to the wall of the showering enclosure. The plurality of legs and the base are formed of a resilient material.

Yet another exemplary embodiment relates to a method for installing a wall jamb for a showering enclosure. A wall jamb comprising a plurality of legs configured to receive the shower door panel therebetween, a base connecting the plurality of legs such that the wall jamb is generally U-shaped, and a pressure sensitive adhesive disposed at an exterior surface of the base, is placed on a shower door panel. A portion of adhesive backing material of the pressure sensitive material is removed. The shower door panel is pushed toward a wall of the showering enclosure such that the wall jamb adheres to the wall. Any remaining adhesive backing material of the pressure sensitive material is removed.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The accompanying drawings, which are included to provide further understanding of the invention, are incorporated in and constitute a part of this specification, illustrate embodiments of the present disclosure and together with the detailed description serve to explain the principles of the present disclosure. No attempt is made to show structural details of the present disclosure in more detail than may be necessary for a fundamental understanding of the present disclosure and the various ways in which it may be practiced.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology is for the purpose of description only and should not be regarded as limiting. An effort has been made to use the same or like reference numbers throughout the drawings to refer to the same or like parts.

Figure 6:
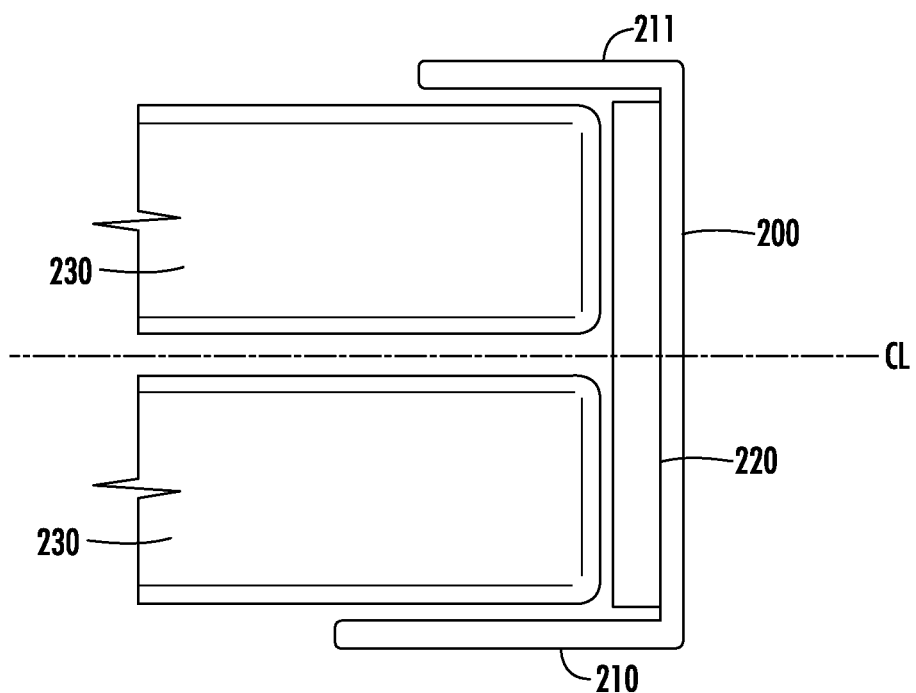
FIG. 6 is a top view of a first embodiment of a conventional wall jamb seal known in the art.

Referring to FIG. 6, in an embodiment illustrating one example of a conventional wall jamb 200, the wall jamb 200 is a rigid extrusion, asymmetrical about a centerline CL. A leg 210 of the wall jamb 200 located towards an outside of the showering enclosure is longer than a leg 211 located towards an inside of the showering enclosure. The leg 211 may not be part of the rigid extrusion, but a resilient material applied separately, as needed. A bumper 220 may be placed locally at a wall connection where the wall jamb 200 is anchored to a wall (not illustrated), or at other points along the wall jamb's length, to prevent shower door panels 230 from contacting the wall jamb 200 in order to prevent damage to the shower door panels 230. Water is contained within the showering enclosure by an overlap of the wall jamb legs 210 and 211 and the shower door panels 230. In such a configuration, shower door panels 230 that are disposed closer together, disposed closer to the wall jamb 200, and are more overlapped by the legs 210 and 211 of the wall jamb 200 provide better water containment.

Figure 7:
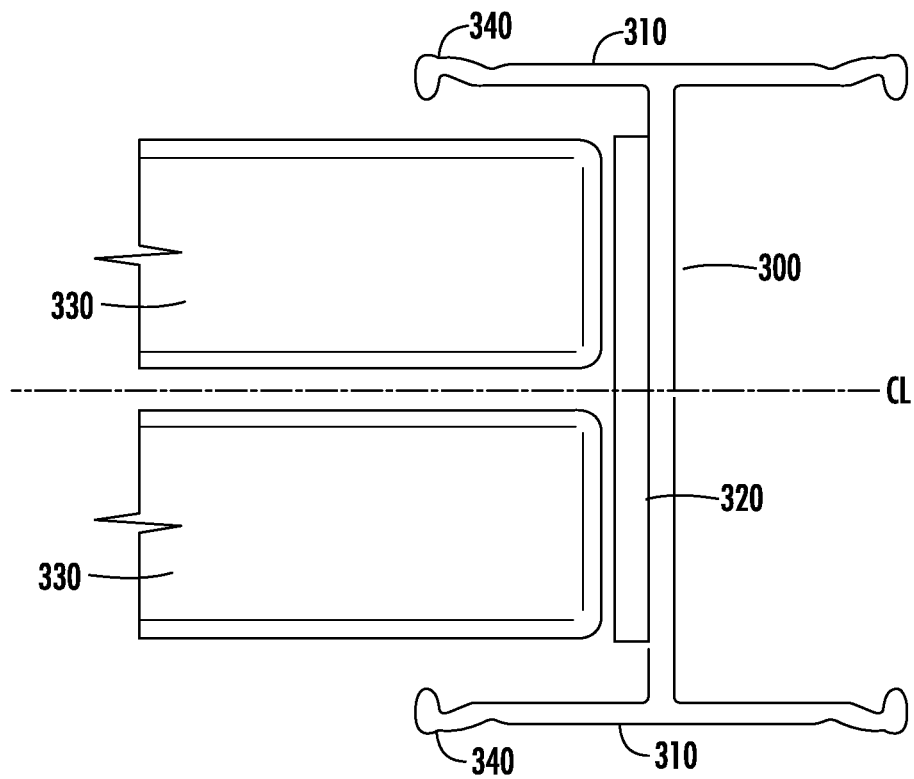
FIG. 7 is a top view of a second embodiment of a conventional wall jamb seal known in the art.

Referring to FIG. 7, in another embodiment illustrating one example of a conventional wall jamb 300, the wall jamb 300 is a rigid extrusion, symmetrical about a centerline CL. A bumper 320 may be placed locally at a wall connection where the wall jamb 300 is anchored to the wall (not illustrated), or at other points along the wall jamb's length, to prevent the shower door panels 330 from contacting the wall jamb 300 in order to prevent damage to the shower door panels 330. Water is contained within the showering enclosure by an overlap of wall jamb legs 310 and the shower door panels 330. To help with water management, a detail with a sharp bend 340 may be present on outermost edges of the wall jamb 300, or protruding geometry may be present on the innermost edges of the wall jamb 300. The sharp bend 340 or protruding geometry prevents water from "wrapping" around the wall jamb 300 and exiting the showering enclosure. In such a configuration, shower door panels 330 that are disposed closer together, disposed closer to the wall jamb 300, and are more overlapped by the legs 310 of the wall jamb 300 provide better water containment. Other variations of the wall jamb 300 may include having a "bridge" of the H-shape wall jamb 300 be asymmetrical.

Referring generally to FIGS. 1-5, an exemplary embodiment relates to an improved resilient wall jamb seal for a shower door that provides a water barrier between the connection of the shower door and the wall and may also maintain the closed position of the shower door and decelerate it upon closing. The resilient wall jamb seal, described in further detail below, replaces a typically rigid wall jamb (see FIGS. 6 and 7) with a resilient wall jamb. The wall jamb resists the shower door from rolling open under the weight of the shower door. In addition, the configuration of the wall jamb reduces the size of the wall jamb required to provide a water barrier and may eliminate the need for installing a bumper to cushion the closing of the door at a location of the wall jamb.

Moreover, the installation method for the wall jamb described in further detail below eliminates the need for drilling holes and installing mechanical fasteners to walls of a showering enclosure. The installation method changes the order in which the shower door and the wall jamb are installed and reduces the installation time.

Figure 1:
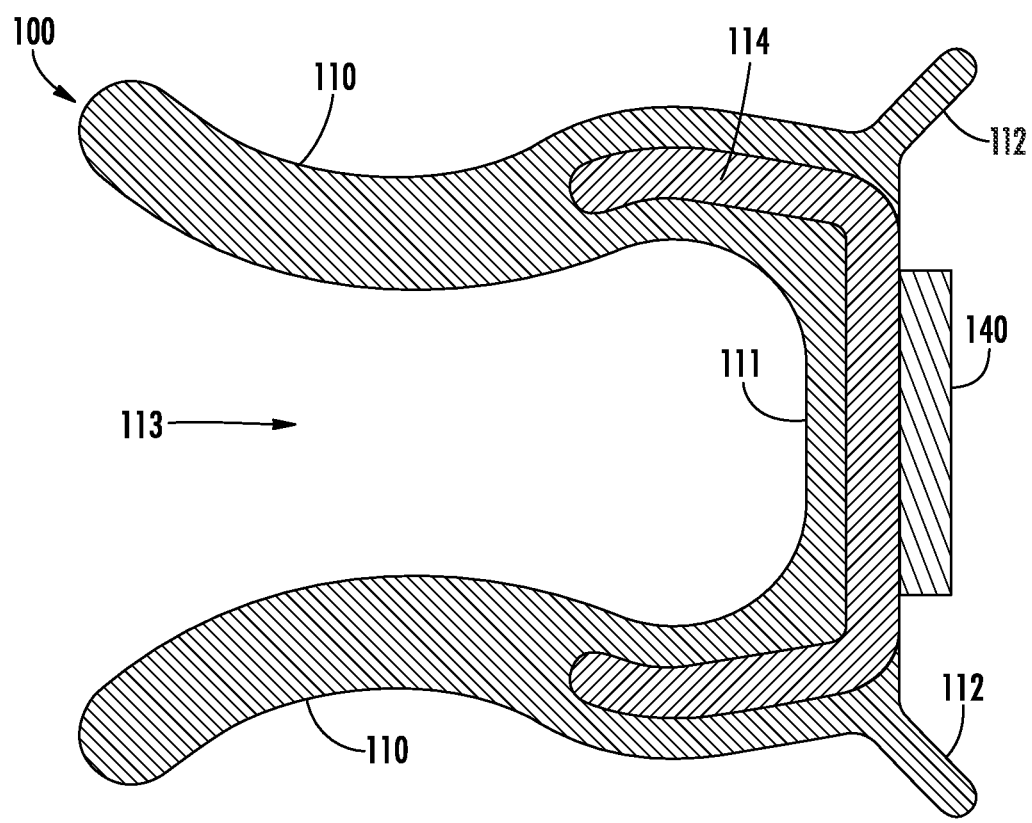
FIG. 1 is a top view of an exemplary embodiment of a wall jamb seal for a shower door panel.
Figure 2:
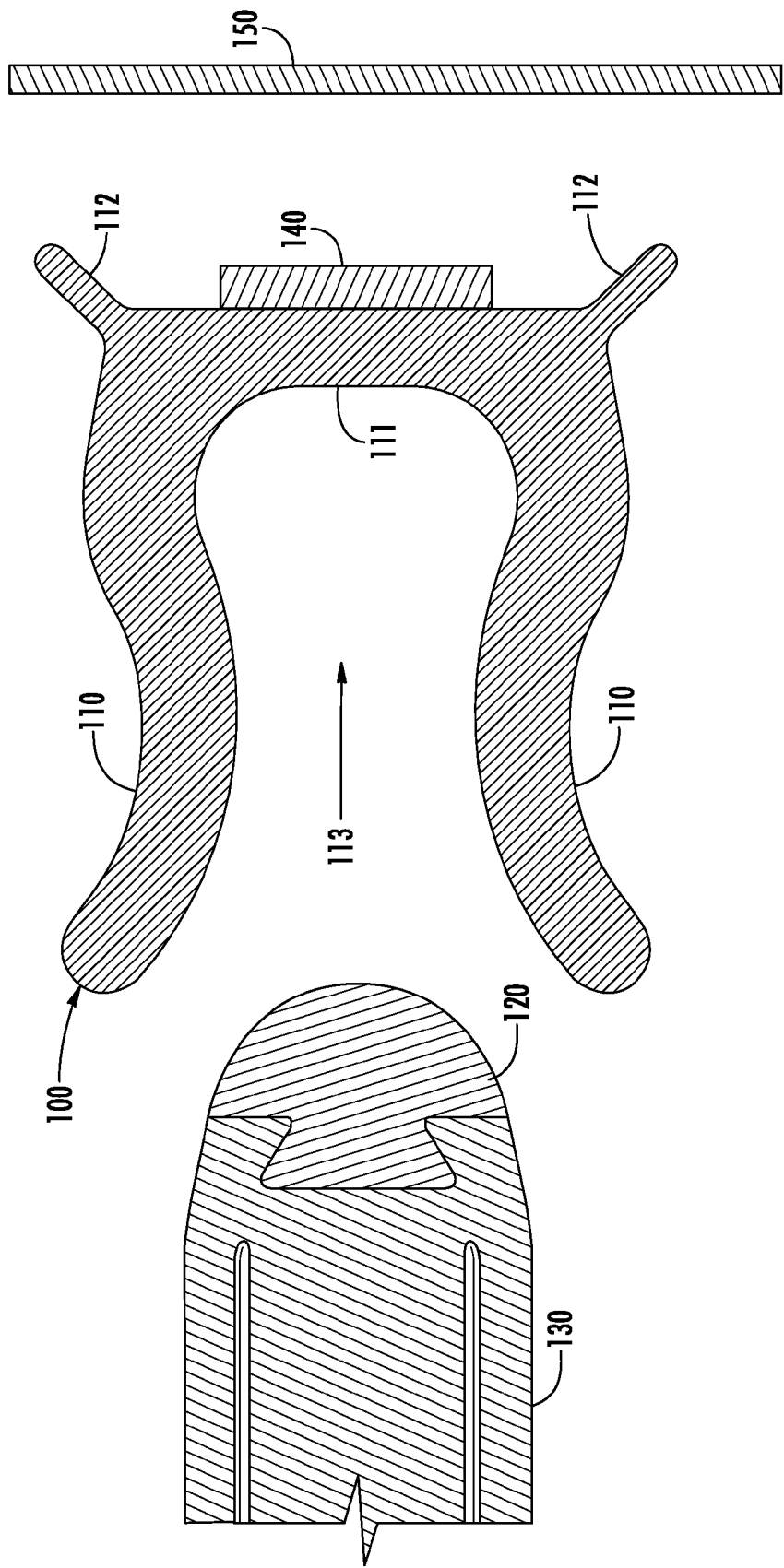
FIG. 2 is a top view of the wall jamb of FIG. 1, prior to installation in a shower.

Referring to the figures more particularly, as illustrated in FIG. 1, an exemplary embodiment of a wall jamb 100 includes legs 110, a base 111 connecting the legs 110, and an adhesive 140 (e.g., a pressure sensitive adhesive) disposed at an exterior surface of the base 111. Optionally, a plurality of fins 112 that protrude from the base 111 may be included. In one embodiment, the legs 110, the base 111 and the fins 112 are preferably integrally formed. The legs 110 and the base 111 form a generally U-shaped wall jamb 100 having a bowed-in profile. In an exemplary embodiment, the wall jamb 100 is symmetrical about a center line drawn along a direction in which the shower door panel 130 is inserted, but may also be asymmetrical about its center line.

One of ordinary skill in the art will appreciate that FIGS. 1-5 are top end views and the wall jamb 100 (i.e., the legs 110, the base 11, the fins 112 and the adhesive 140) is elongated and extends along a majority of the entire height up to the entire height of the shower door panel 130 (i.e., a majority of the entire height up to the entire length of a side of the shower door panel 130 that abuts a wall 150 of the showering enclosure).

The wall jamb 100 is configured to receive the shower door panel 130 (see FIGS. 2-5) between the legs 110 when the shower door panel 130 is being closed or in a closed position such that the wall jamb 100 forms a wall jamb seal. The wall jamb 100 is made of a resilient material such as a rubber or other flexible and resilient material that allows for the shower door panel 130 to expand an opening 113 of the wall jamb 100. In an exemplary embodiment, the wall jamb 100 may further include a rigid material 114 such as a metal or a plastic, configured to help the wall jamb 100 maintain its shape. The rigid material 114 may be generally U-shaped and disposed in the base 111 and/or in at least a bottom portion of the legs 110.

Figure 3:
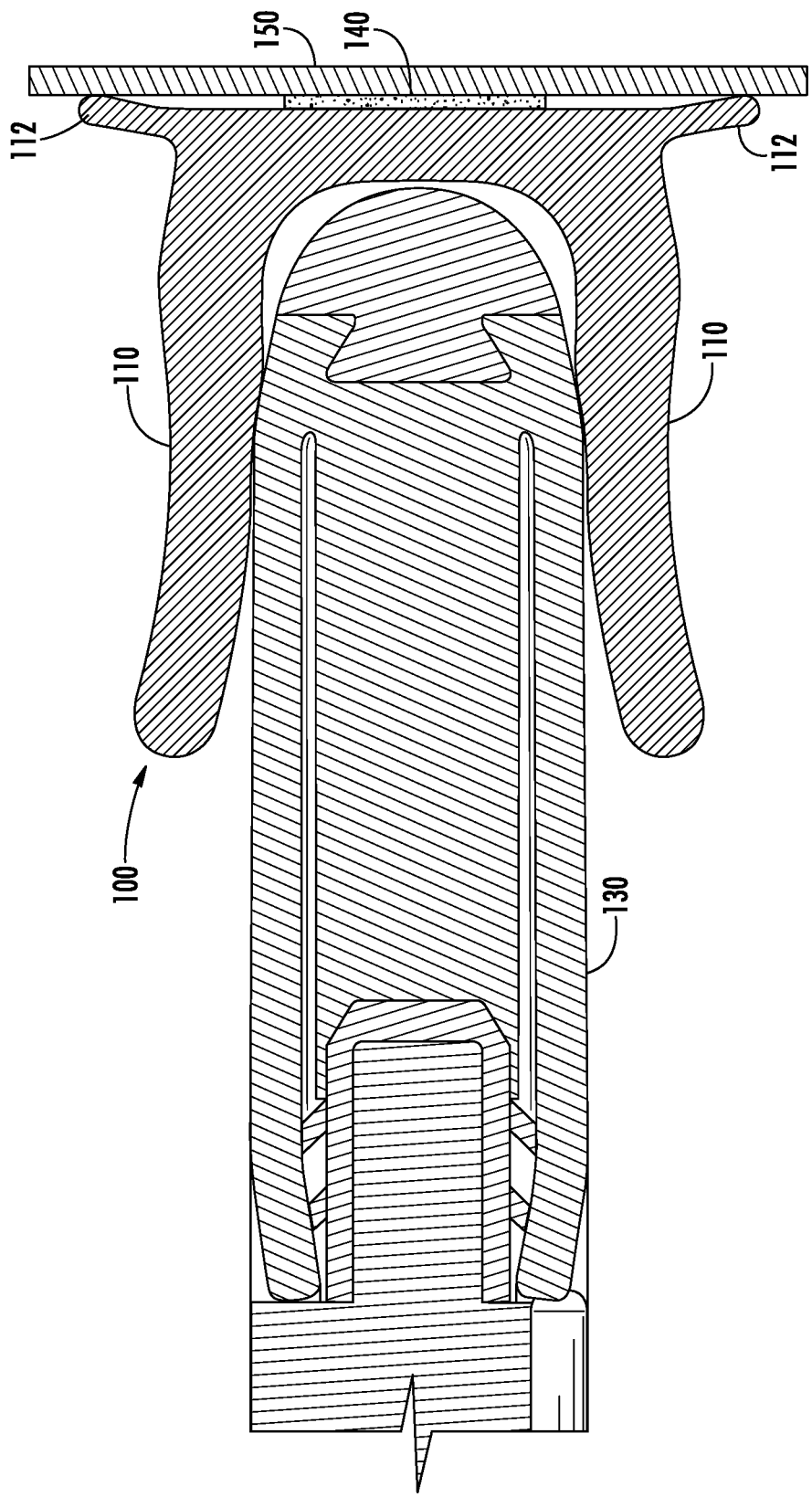
FIG. 3 is a top view of the wall jamb of FIG. 1, during installation in a shower.
Figure 4:
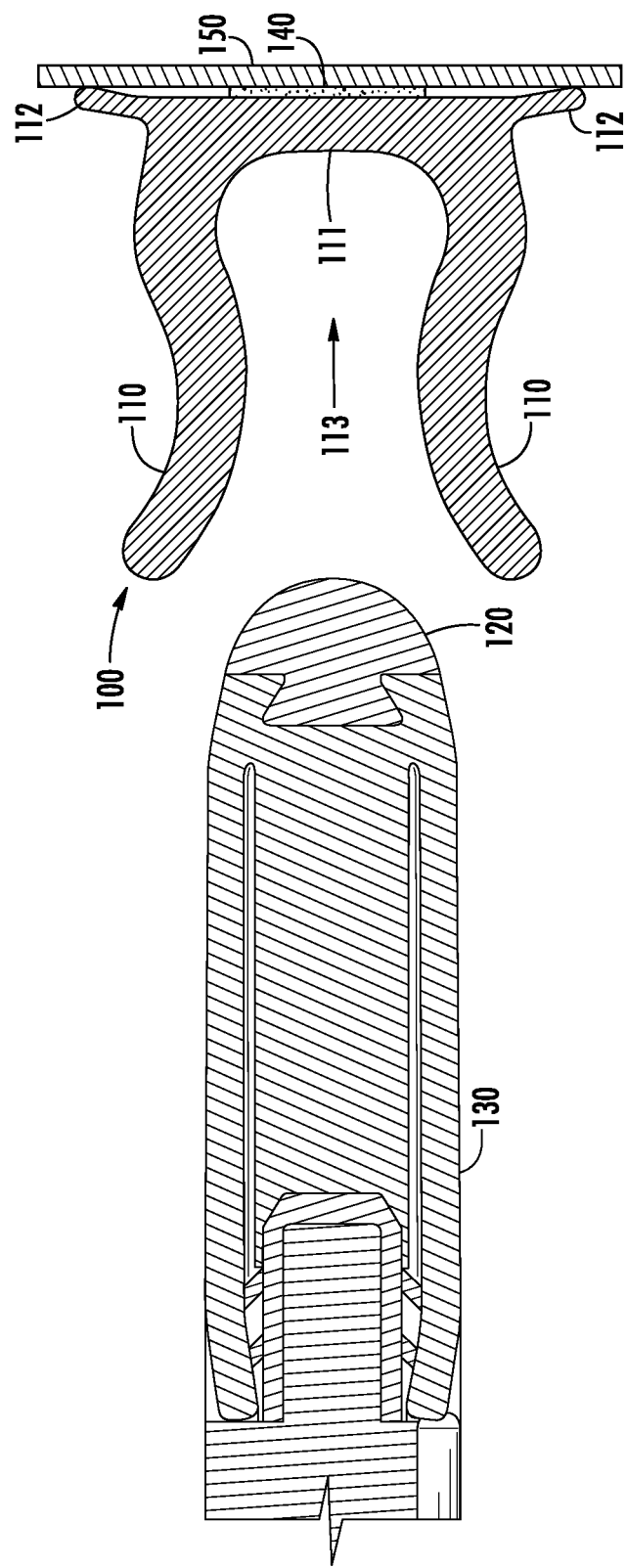
FIG. 4 is a top view of the wall jamb of FIG. 1, after installation in a shower.

When the shower door panel 130 is received in the wall jamb 100, an interference fit between the rigid shower door panel 130 and the legs 110 of the wall jamb 100 forces the opening 113 of the wall jamb 100 to widen, via a deformation of the legs 110 (see FIG. 3). As illustrated in FIG. 1, in an original state, a middle portion of the opening 113, defined by the bowed-in legs 110, is narrower than other portions (i.e., a front portion and a rear portion) of the opening 113. Thus, when the shower door 130 is received in the wall jamb 100, the bowed-in portion of the plurality of legs 110 (i.e., the portion disposed at the middle portion of the opening 113) is capable of, but not limited to, obtaining a clamp-like hold on the shower door panel 130, or a close fit. The clamp-like hold allows the wall jamb 100 to achieve better water containment and to maintain the closed position of the shower door panel 130 in the event that the shower door panel 130 is unevenly hung and prone to opening on its own. The bowed-in profile of the wall jamb 100 allows the shower door panel 130 to self-align with the wall jamb 100 as the shower door panel 130 is closed. The geometry of the wall jamb 100 also decelerates the shower door panel 130 in the event the shower door panel 130 is slammed shut. In other words, the wall jamb 100 provides a bumper-like cushion to the shower door panel 130.

The resilient material of the wall jamb 100 allows the opening 113 of the wall jamb 100 to return or recoil into its original configuration (see FIGS. 1 and 4) when the shower door panel 130 is opened (i.e., when the shower door panel 130 is not received between the legs 110 of the wall jamb 100). The geometry of the wall jamb 100 allows for a low input force required to open a shower door panel 130 (see FIGS. 2-5) and remove the shower door panel 130 from the wall jamb 100.

The pressure sensitive adhesive 140 is pre-applied to the exterior of the base 111 of the wall jamb 100. The pressure sensitive adhesive 140 is configured to withstand moisture and variations in temperature without losing adhesion strength. The pressure sensitive adhesive 140 may be, for example, double-sided tape.

Rather than installing the shower door panel 130 after installing the wall jamb 100, the wall jamb 100 is instead installed using the shower door panel 130 as a locating guide after the shower door panel 130 is installed in position. To install the wall jamb 100, the wall jamb 100 is placed onto the shower door panel 130, such that the shower door panel 130 is received between the legs 110 of the wall jamb 100. An adhesive backing material of the pressure sensitive adhesive 140 may then be incrementally or completely removed. For example, when the adhesive backing material of the pressure sensitive adhesive material is incrementally removed, a portion of the adhesive backing material is removed, and the shower door panel is pushed toward a wall 150 of the showering enclosure (i.e., the shower door panel 130 is closed) such that the portion of the wall jamb 100 from which the adhesive backing material was removed adheres to the wall

150. Then, an additional portion of the adhesive backing material can be removed such that an additional portion of the wall jamb 100 from which the additional portion of the adhesive backing material was removed may be adhered to the wall 150 of the showering enclosure. The process is repeated until the adhesive backing material is completely removed and the entire wall jamb 100 is adhered to the wall 150. Incremental removal of the adhesive backing provides control over the placement of the wall jamb 100 on the wall 150 in the event that the shower door panel 130 is not completely straight or plumb. Alternatively, the entire adhesive backing material may be removed in a single step such that the entire wall jamb 100 adheres to the wall 150 when the shower door panel 130 is closed.

When the wall jamb 100 is installed, the fins 112 of the wall jamb 100 spread out and the exposed pressure sensitive adhesive 140 adheres to the wall 150. The fins 112 are thin and flexible, allowing the fins 112 to conform to a surface of the wall 150. When the shower door panel 130 is opened, the wall jamb 100 will remain adhered to the wall 150 (see FIG. 4). However, if desired, the installer may manually push the wall jamb 100 onto the wall 150, firmly along a length of the wall jamb 100, to ensure the pressure sensitive adhesive 140 is fully engaged with the wall 150. As a result, the wall jamb 100 is positively located, in-line with the shower door panel 130 on the wall 150.

The method of installing the wall jamb 100 described above eliminates the need for drilling holes or installing mechanical fasteners in the wall 150, as required in the methods for installing conventional wall jambs. In addition, by changing the order in which the shower door components are installed, the overall installation time can be reduced.

Figure 5:
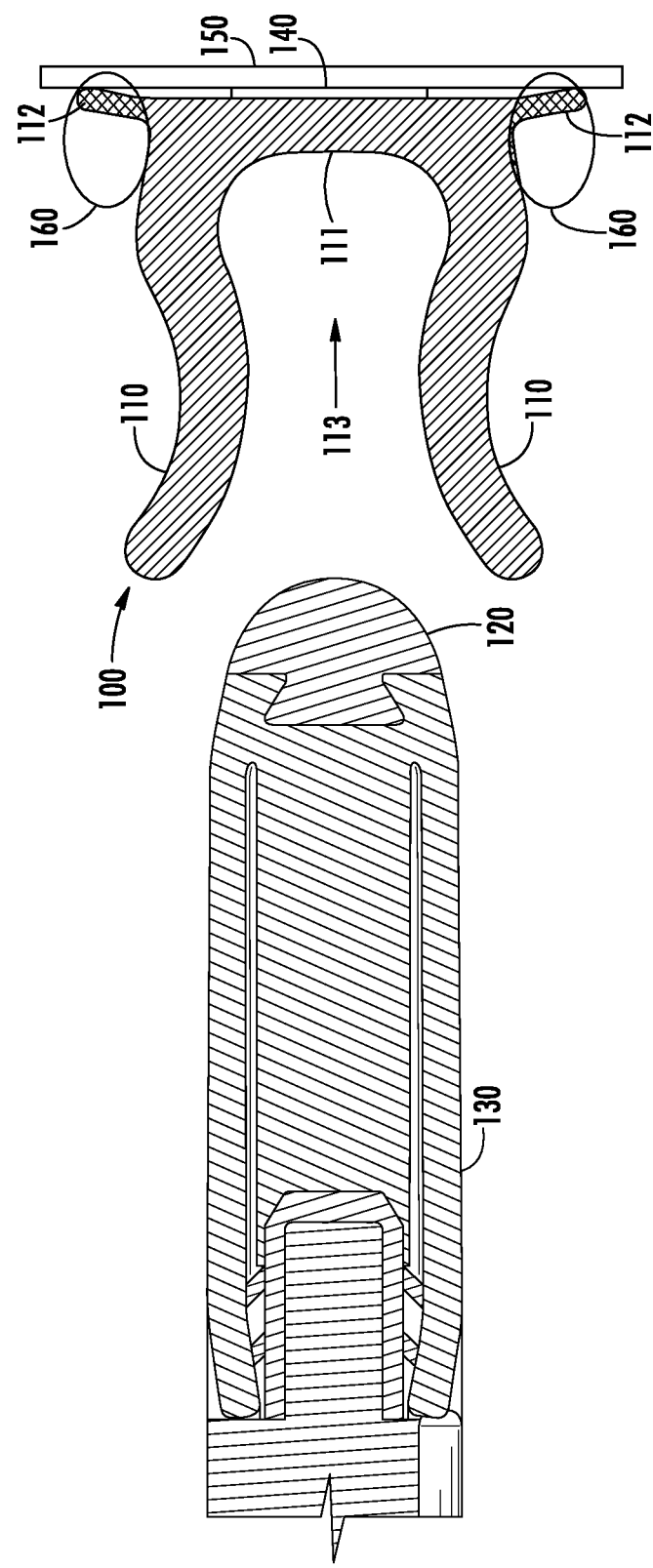
FIG. 5 is a top view of the wall jamb of FIG. 4 provided with optional silicone sealant.

In an exemplary embodiment, installation may include an additional step of filling any voids between the wall 150 and the wall jamb 100 with a silicone sealant 160 (see FIG. 5). Specifically, the silicone sealant 160 may be used in any location where the fins 112 do not fully cover and seal the voids. One of ordinary skill in the art will appreciate that the addition of the silicone sealant 160 is optional and not required for water containment.

Although only one shower door panel 130 is illustrated in FIGS. 2-5, one of ordinary skill in the art will appreciate that a shower door typically comprises two shower door panels (i.e., double doors), as illustrated in FIGS. 6 and 7. When both shower door panels are in the closed position, a first shower door panel (e.g., an inside shower door panel) abuts a wall nearest to or upon which a shower head is mounted, and a second shower door panel (e.g., an outside shower door panel), abuts a wall opposite to the wall that the first shower door panel abuts. Thus, in one embodiment, the wall jamb 100 allows for a smaller wall jamb to be used, as compared to the wall jambs 200 and 300 of FIGS. 6 and 7, in that a single wall jamb 100 can be used to seal one side of each shower door panel. In other words, a first wall jamb 100 can be provided for the first shower door panel at the wall nearest to or upon which the shower head is mounted, while a second wall jamb 100 can be provided for the second door at the opposite wall. In contrast, the wall jambs 200 and 300 of FIGS. 6 and 7 receive both shower door panels 230, 330 within a single wall jamb 200, 300. In this embodiment, only one side of each shower door panel is received in the wall jamb 100 (i.e. a total of two wall jambs 100 are provided). Because one self-aligning wall jamb 100 is provided for each of the shower door panels, the wall jambs 100 may still be easily installed without cumbersome measurement or alignment steps, even if the shower door panels are not disposed perfectly parallel to each other.

In other embodiments, a wall jamb 100 may be provided on both sides of each shower door panel, such that the shower door panel is received in a wall jamb 100 when it is in a closed position (described above) and when it is in a full open position (i.e., when the first shower door panel abuts the opposite wall and the second shower door panel abuts the wall nearest to or upon which the shower head is mounted). In this embodiment, a total of four wall jambs 100 are provided.

The wall jamb 100 may be used with any shower door panel 130. As described above, the wall jamb 100 provides a bumper-like cushion to the shower door panel 130, eliminating the need to install a separate bumper. However, in other embodiments, the wall jamb 100 may be used with a shower door panel 130 having a bumper 120 integrally formed or separately formed and connected to the shower door panel 130. The bumper 120 is disposed between the shower door panel 130 and the wall jamb 100.

According to the embodiments described above, an aesthetically pleasing wall jamb for a shower door is provided. The wall jamb serves as a water barrier between the connection of the shower door and the wall and maintains the closed position of the shower door.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the wall jamb as shown and/or described in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A wall jamb for a showering enclosure comprising:
   a plurality of legs configured to receive a side of a shower door panel;
   a base connecting the plurality of legs such that the wall jamb is an elongated member defining a length, wherein the base and the plurality of legs collectively define a generally U-shaped cross-section taken transversely to the length of the wall jamb; and
   a pressure sensitive adhesive disposed at an exterior surface of the base, the pressure sensitive adhesive configured to adhere to a wall of the showering enclosure,
   wherein the plurality of legs and the base are formed of a resilient material, and
   wherein the plurality of legs are configured to obtain a clamp-like hold on the shower door panel when the shower door panel is received therebetween.

2. The wall jamb according to claim 1, wherein the wall jamb extends for a length greater than half of an entire length of the side of the shower door panel.

3. The wall jamb according to claim 1, wherein the wall jamb is symmetrical about a center line drawn along a direction in which the shower door panel is inserted.

4. The wall jamb according to claim 1, wherein in an original state in which the shower door panel is not received by the plurality of legs, the wall jamb has a bowed-in profile such that a middle portion of an opening defined by the plurality of legs is narrower than other portions of the opening.

5. The wall jamb according to claim 4, wherein when the plurality of legs receive the shower door panel therebetween, the plurality of legs deform such that an interference fit between the shower door panel and the plurality of legs at the middle portion of the opening allows the wall jamb to obtain the clamp-like hold on the shower door panel.

6. The wall jamb according to claim 4, wherein when the shower door panel is removed from the wall jamb, the wall jamb returns to the original state.

7. The wall jamb according to claim 1, further comprising a plurality of fins protruding from the base, the plurality of fins configured to form a seal between the wall jamb and the wall of the showering enclosure.

8. The wall jamb according to claim 1, further comprising a rigid material disposed within at least the base of the wall jamb, the rigid material configured to help the wall jamb maintain its shape.

9. The wall jamb according to claim 8, wherein the rigid material is generally U-shaped and disposed within the base and at least a portion of the plurality of legs of the wall jamb.

10. The wall jamb according to claim 1, wherein the pressure sensitive adhesive is double-sided tape.

11. A system for sealing a showering enclosure comprising:
    at least one shower door panel; and
    at least one wall jamb configured to be installed on a wall of the showering enclosure, the wall jamb comprising:
    a plurality of legs configured to receive a side of the shower door panel;
    a base connecting the plurality of legs such that the wall jamb is an elongated member defining a length, wherein the base and the plurality of legs collectively define a generally U-shaped cross-section taken transversely to the length of the wall jamb; and
    a pressure sensitive adhesive disposed at an exterior surface of the base, the pressure sensitive adhesive configured to adhere to the wall of the showering enclosure,
    wherein the plurality of legs and the base are formed of a resilient material, and
    wherein the plurality of legs are configured to obtain a clamp-like hold on the shower door panel when the shower door panel is received therebetween.

12. The system according to claim 11, further comprising:
    a first wall jamb configured to be installed on a first wall of the showering enclosure; and
    a second wall jamb configured to be installed on a second wall of the showering enclosure disposed opposite from the first wall of the showering enclosure,
    wherein the first wall jamb is configured to receive a first side of the shower door panel and the second wall jamb is configured to receive a second side of the shower door panel.

13. The system according to claim 11, further comprising:
    a first shower door panel;
    a second shower door panel;
    a first wall jamb configured to be installed on a first wall of the showering enclosure; and
    a second wall jamb configured to be installed on a second wall of the showering enclosure disposed opposite from the first wall of the showering enclosure,
    wherein the first wall jamb is configured to receive a side of the first shower door panel and the second wall jamb is configured to receive a side of the second shower door panel.

* * * * *